United States Patent [19]

Huzenlaub et al.

[11] Patent Number: 5,404,491
[45] Date of Patent: Apr. 4, 1995

[54] SUBSCRIBER MODULE FOR CONNECTION TO A PLURALITY OF SUBSCRIBER TERMINALS AND TO AN INTEGRATED SERVICES DIGITAL COMMUNICATION NETWORK (ISDN)

[75] Inventors: Richard Huzenlaub, Höfen; Peter Junius, Bietigheim, both of Germany

[73] Assignee: Alcatel N.V., Netherlands

[21] Appl. No.: 553,165

[22] Filed: Jul. 13, 1990

[30] Foreign Application Priority Data

Jul. 13, 1989 [DE] Germany ............... 39 23 125.9

[51] Int. Cl.6 ............................................ G06F 13/00
[52] U.S. Cl. ................... 395/500; 364/284.4; 364/926; 364/949.4; 364/239; 364/DIG. 1
[58] Field of Search .............. 395/200, 500, 800; 379/59, 60, 61, 62, 63

[56] References Cited

U.S. PATENT DOCUMENTS

| | | |
|---|---|---|
| H586 | 2/1989 | Kun ........................................ 370/94 |
| 4,578,789 | 3/1986 | Middleton ............................. 370/58 |
| 4,697,281 | 9/1987 | O'Sullivan ........................... 379/59 |
| 4,763,317 | 8/1988 | Lehman ................................ 370/58 |
| 4,901,312 | 2/1990 | Hui ................................... 370/85.12 |
| 4,926,420 | 5/1990 | Shimizu .............................. 370/94.1 |
| 4,991,197 | 2/1991 | Morris ................................. 379/58 |
| 4,998,248 | 3/1991 | Matsuzaki ......................... 370/110.1 |
| 5,077,734 | 12/1991 | Ohtsuka ............................ 370/100.1 |
| 5,127,041 | 6/1992 | O'Sullivan ........................... 379/59 |

*Primary Examiner*—Eric Coleman
*Attorney, Agent, or Firm*—Ware, Fressola, Van Der Sluys & Adolphson

[57] ABSTRACT

An ISDN subscriber line module (1) for arbitrary terminal configurations (analog, digital terminals) is to be provided which is capable of handling internal traffic between analog and digital terminals. To this end, the ISDN subscriber line module (1) according to the invention includes a computer unit (2, 3) with an internal bus (4) in the ISDN format to which a digital subscriber interface (6), an analog subscriber interface (11), and an ISDN network interface (5) are coupled. The computer unit (2, 3) is programmed in accordance with the respective terminal configuration.

18 Claims, 1 Drawing Sheet

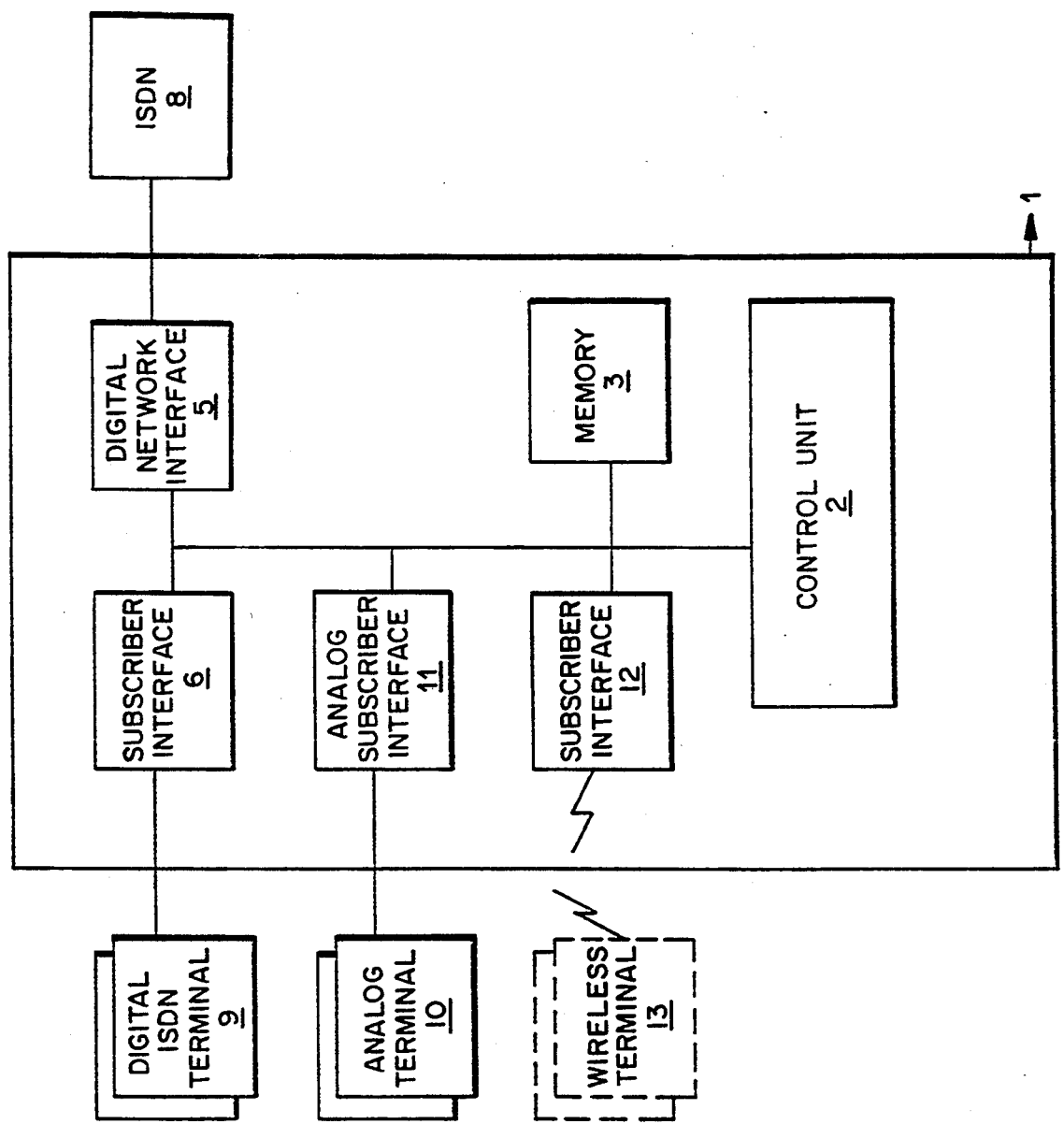

SUBSCRIBER MODULE FOR CONNECTION TO A PLURALITY OF SUBSCRIBER TERMINALS AND TO AN INTEGRATED SERVICES DIGITAL COMMUNICATION NETWORK (ISDN)

BACKGROUND OF THE INVENTION

1. Field of the Invention

The present invention relates to a subscriber line module for connecting a plurality of subscriber terminals to an integrated services digital network (ISDN).

2. Description of the Prior Art

In the ISDN, the so-called network termination NT is defined, which terminates the transmission link to the subscriber terminal exchange via the likewise defined $U_0$ interface on the network side and contains an internationally standardized user/network interface $S_0$ on the subscriber side, which allows the direct connection of digital (ISDN) terminals to the network.

To allow the connection of analog terminals, which are designed to be connected only to an analog telephone network, a terminal adapter TA is necessary between the terminal and the $S_0$ interface ("ISDN-Praxis" K. H. Rosenbrock, G. Hentschel, Loseblatt-Ausgabe, ISBN-3-923759-10-X (Grundwerk 1988), Chapters 3.2 and 5.4).

Particularly if existing analog terminals are to be used in the ISDN, this terminal adapter TA represents a very expensive solution.

The technical problem to be solved by the invention is to implement a universal subscriber line module which makes it possible to connect arbitrary analog and digital terminals to an integrated services digital network (ISDN) at low cost.

SUMMARY OF THE INVENTION

According to the invention, this problem is solved by a universal subscriber line module for connecting a plurality of subscriber terminals to an integrated services digital communication network, comprising a control unit, an internal system bus connected to the control unit, at least one digital subscriber interface for digital terminals which is connected to the system bus, at least one analog subscriber interface for analog terminals which is connected to the system bus, and a digital network interface for the digital communication network which is connected to the system bus.

With the universal subscriber line module, which, according to an advantageous aspect of the invention, may form part of a digital terminal, a "small" exchange with analog and digital terminals is implemented under control of a microprocessor which is usually present anyhow, so that internal traffic between analog and analog, analog and digital, or digital and digital terminals can be controlled in a simple manner. In addition, ISDN service features can be converted and made available to tile analog terminals.

By suitable programming of the control unit and storage of configuration parameters, the universal subscriber line module makes it possible to operate any analog terminal together with one or more digital terminals in the ISDN.

DESCRIPTION OF THE DRAWING

An embodiment of the invention will now be explained with reference to the accompanying drawing.

The drawing is a block diagram of the universal subscriber line module in accordance with the invention.

DETAILED DESCRIPTION OF THE PREFERRED EMBODIMENT

A universal subscriber line module 1 has a control unit 2, which includes a digital memory 3. The control unit and the memory 3 are interconnected by an internal system bus 4.

Also connected to the system bus 4 is a digital subscriber interface 6, i.e., an $S_O$ interface, which provides the interface to digital (ISDN) terminals 9.

To allow the connection of analog terminals 10, an analog subscriber interface 11 is connected to the system bus 4.

In addition, as shown in the figure, a radiotelephone subscriber interface 12 for wireless terminals 13, such as cordless telephone sets, may be connected to the system bus 4. The universal subscriber line module 1 further includes a digital network interface 5, i.e., a $U_0$ interface, which is connected to the system bus 4 and provides the interface to an integrated services digital network 8.

Commonly needed parts, such as power and clock supplies, are not shown for the sake of clarity.

To be able to connect all analog and digital terminals to the digital network, the digital memory 3 of the control unit 2 contains all configuration parameters required to control and monitor the module.

This makes it possible to adapt the subscriber line module 1 according to the invention to any terminal configuration by simple programming.

To permit access to the digital communications network ISDN - two 64-kb/s B channels for information and a 16-kb/s D channel for signalling—, the format of the internal system bus 4 is as follows. The frame consists of four octets, with the first two octets containing two 64-kb/s B channels, the third octet supervisory information, and the fourth octet signalling and control information (2 bits for the D channel).

The subscriber interfaces 6, 11, 12 perform the conversion from and to the internal system bus 4. The digital subscriber interface 6 is designed as an $S_0$ interface or as a $U_{PO}$ interface for ISDN terminals, with 4-wire/2-wire connection being possible.

The analog subscriber interface 11 adapts an analog subscriber line (a/b) or a bus system connected to analog terminals to the internal system bus 4. It performs essentially a 2-wire/4-wire conversion and a signalling-data conversion and includes a codec for analog to digital or digital-to-analog conversion.

Similarly, the radiotelephone subscriber interface 12 performs a conversion to the internal system bus 4 for wireless terminals 13, such as cordless telephones.

In addition, the subscriber line module according to the invention permits internal traffic between the subscriber terminals 9, 10, 13. To this end, predetermined signalling sequences are stored in the digital memory 3, so that in response to a request for an internal connection, a path is completed between two terminals under control of the control unit 2 without any signalling taking place via the $U_0$ interface 5 to the ISDN 8.

It is possible to establish connections between analog and digital terminals or between analog and analog terminals, but also between digital and digital terminals (e.g., family telephone system with analog terminals, a cordless telephone, and an ISDN terminal).

An incoming call is applied via the subscriber interfaces 6, 11, 12 to all connected terminals 9, 10, 13 in parallel under control of the control unit 2, so that it can be taken at both digital and analog terminals.

A predetermined signalling sequence stored in the digital memory 2 makes it possible to transfer the call internally from one terminal to another.

If a terminal is busy, an incoming call will be applied in parallel to all idle terminals. At the same time, a signal indicating the incoming all may be transmitted to the busy terminal ("call waiting"). In the case of ISDN terminals with a data display, the number of the calling subscriber may be additionally displayed.

The control unit may also be programmed so that an incoming call can be applied only to particular terminals, e.g., only to the terminals installed in the living room of a house (not in the bedroom).

Since digital terminals 9 normally have a control unit of their own, according to a further advantageous aspect of the invention, the universal subscriber line module 1 may be designed as an integral part of the ISDN terminal, in which case the functions of the control unit 2 of the subscriber line module 1 may be performed by the control unit of the digital terminal 9.

The universal subscriber line module 1 thus permits optimum adaptation to existing terminal configurations and to service features of the latter in connection with the advantages of an ISDN network termination.

Moreover, an extension/change of the terminal configuration, both analog and digital, is possible at any time at low cost by simple programming.

What is claimed is:

1. Apparatus for connecting a plurality of subscriber terminals to an integrated services digital communication network (ISDN), comprising:
   at least one ISDN-S$_0$ digital subscriber interface for interfacing to digital terminals of a subscriber and which is connected to an internal system bus;
   at least one analog subscriber interface for interfacing to analog terminals of a subscriber which is also connected to the system bus;
   an ISDN-U$_0$ digital network interface for interfacing to the integrated services digital communication network and which is also connected to the system bus; and
   a control unit, connected to the internal system bus for controlling information exchanges between the terminals of the subscriber and the integrated services digital communication network, wherein the internal system bus is formatted in a frame comprising four octets, with the first two octets containing two 64-kilobyte per second B channels, the third octet containing supervisory information, and the fourth octet containing signalling and control information.

2. Apparatus as claimed in claim 1, wherein said apparatus forms an integral part of a digital terminal.

3. Apparatus as claimed in claim 1, further comprising at least one radiotelephone subscriber interface for wireless terminals which is connected to the system bus.

4. Apparatus as claimed in claim 3, which forms an integral part of a digital terminal and is constructed in such a way that control unit of the digital terminal performs the functions of the control unit of the subscriber line module.

5. Apparatus as claimed in claim 3, wherein the control unit includes a digital memory which is connected to the system bus and in which all configuration parameters required to control and monitor the apparatus are stored.

6. Apparatus as claimed in claim 5, which forms an integral part of a digital terminal and is constructed in such a way that a control unit of the digital terminal performs the functions of the control unit of the apparatus.

7. Apparatus as claimed in claim 5, wherein the digital memory of the control unit contains signalling sequences which are used to detect requests for internal connections between terminals and to switch through internal calls.

8. Apparatus as claimed in claim 7, which forms an integral part of a digital terminal and is constructed in such a way that a control unit of the digital terminal performs the functions of the control unit of the apparatus.

9. Apparatus as claimed in claim 7, wherein an incoming call can be applied in parallel to all connected or to predeterminable individual connected terminals which are not busy, with a signal indicative of an incoming call being simultaneously transmissible to the busy terminal.

10. Apparatus as claimed in claim 9, which forms an integral part of a digital terminal and is constructed in such a way that a control unit of the digital terminal performs the functions of the control unit of the apparatus.

11. Apparatus as claimed in claim 1, wherein the control unit includes a digital memory which is connected to the system bus and in which all configuration parameters required to control and monitor said apparatus are stored.

12. Apparatus as claimed in claim 11, which forms an integral part of a digital terminal and is constructed in such a way that a control unit of the digital terminal performs the functions of the control unit of the apparatus.

13. Apparatus as claimed in claim 11, wherein an incoming call can be applied in parallel to all connected or to predeterminable individual connected terminals which are not busy, with a signal indicative of an incoming call being simultaneously transmissible to the busy terminal.

14. Apparatus as claimed in claim 13, which forms an integral part of a digital terminal and is constructed in such a way that a control unit of the digital terminal performs the functions of the control unit of the apparatus.

15. Apparatus as claimed in claim 11, wherein the digital memory of the control unit contains signalling sequences which are used to detect requests for internal connections between terminals and to switch through internal calls.

16. Apparatus as claimed in claim 15, which forms an integral part of a digital terminal and is constructed in such a way that a control unit of the digital terminal performs the functions of the control unit of the apparatus.

17. Apparatus as claimed in claim 15, wherein an incoming call can be applied in parallel to all connected or to predeterminable individual connected terminals which are not busy, with a signal indicative of an incoming call being simultaneously transmissible to the busy terminal.

18. Apparatus as claimed in claim 17, which forms an integral part of a digital terminal and is constructed in such a way that a control unit of the digital terminal performs the functions of the control unit of the apparatus.

* * * * *